United States Patent Office 3,085,084
Patented Apr. 9, 1963

3,085,084
POLYMERIZATION CATALYST AND PROCESS
William Franklin Gresham and Nicholas George Merckling, Wilmington, Del., assignors to E. I. du Pont de Nemours and Company, Wilmington, Del., a corporation of Delaware
No Drawing. Original application Sept. 7, 1955, Ser. No. 533,023. Divided and this application Jan. 28, 1957, Ser. No. 636,840
1 Claim. (Cl. 260—94.9)

This invention relates to novel catalyst systems which are useful in the polymerization of ethylene to solid polymers. More particularly the invention is directed to catalyst systems employing chromium coordination complexes. The invention also relates to the process of polymerizing ethylene using novel chromium catalyst systems. This application is a divisional application of copending application Serial No. 533,023, filed September 7, 1955, now Patent No. 3,047,513, which in turn is a continuation-in-part of application Ser. No. 470,498, filed November 22, 1954.

Heretofore, it has been widely known that ethylene can be converted to solid polymers under very high pressures in the presence of catalysts which are capable of yielding free radicals under polymerization conditions.

It has also been known heretofore that certain metal alkyls and Grignard reagents are capable of initiating the conversion of ethylene to solid polymers through a free radical mechanism at high pressures. Ethylene has also been converted to solid polymers in the presence of hydrogenation catalysts promoted with alkali metals or alkali metal hydrides.

Generally speaking, Friedel-Crafts type catalysts have not been effective for converting ethylene to solid polymers but instead have resulted in the formation of liquid polymers from ethylene; however, it has recently been reported that solid polymers admixed with oils can be obtained by polymerizing ethylene in the presence of aluminum chloride and titanium chloride at elevated temperatures and high pressures and advantageously in the presence of HCl-binding metals like aluminum powder.

Redox systems have frequently been disclosed for polymerization of olefinic compounds. In the past, redox systems have resulted in the formation of highly-branched low density polymers, except at extremely high pressures, at which high density ethylene polymers have been obtained heretofore. In many of these systems a heavy metal compound was employed in combination with a reducing component. While various theories have been advanced as to the mechanism of polymerization in redox systems, the art of polymerizing olefins in the presence of such combinations of catalyst components has not heretofore advanced to the state at which predictions could be made as to which pairs of oxidizable and reducible components might give good results in the conversion of ethylene to solid polymers except, of course, by further experimentation.

It has been discovered, in accordance with the present invention, that extraordinary and highly useful effects are produced by reducing a compound of chromium, in the manner hereinafter described, and bringing the resulting mixture into contact with a compound containing ethylenic unsaturation. In specific embodiments it has been found that chromium compounds containing chromium combined with such radicals as alkoxy radicals, alkyl radicals and radicals which form acids when combined with hydrogen can be used effectively in the formation of the catalyst. Preferred chromium salts are those which are soluble in inert organic solvents useful as polymerization media. The reduction step is generally performed by admixing a chromium compound with an alkali metal aluminum tetraalkyl. It is known that such agents will reduce the valence of the chromium to a lower state. In particular embodiments a sufficient quantity of the reducing agent is added to the chromium compound to achieve not only the reduction of the chromium to an active state of valence but, in addition, to achieve the formation of the active complex. This active chromium complex is believed to contain chromium in certain electron distribution states which give the complex a catalytic activity made use of in this invention. Coordination of the reactive complex with organic components does not necessarily destroy its ability as a catalyst; in fact, it appears that ethylene is capable of coordinating with the active chromium complex in this manner and quite possibly this phenomenon has a bearing on the mechanism of the polymerization.

The nature of these coordination complexes is not fully understood, but they are evidently active catalysts or catalyst components which are capable of initiating the polymerization of ethylene in an extremely active manner to produce solid ethylene polymers. The density of the polymers obtained through the use of these coordination complexes generally exceeds, at least to some extent, the density of polyethylene prepared by the use of free radical types of catalysts, except those free radical polymerization processes which employ such extremely high pressures as to produce abnormally high density polyethylene as compared with polyethylene made at moderately high pressure (700–1200 atmospheres) by a free radical polymerization process (cf. U. S. Patent 2,586,322).

It is believed that the coordination complexes hereinabove described are novel compounds which have not been employed heretofore in the polymerization of ethylene. The complexes may be isolated by filtering the dark precipitate formed when a chromium compound is admixed with an alkali metal aluminum tetraalkyl in the presence of an inert organic solvent wherein both the chromium compound and the alkali metal aluminum tetraalkyl are soluble. This dark precipitate was found to initiate the polymerization of ethylene to high molecular weight polymers of ethylene. Apparently, the complex of the present invention is only slightly soluble in organic hydrocarbons.

While the polymerization of ethylene to produce solid polymers in the presence of catalysts disclosed herein can be carried out under mild conditions, it is preferable, from an economic standpoint, to employ moderately high pressures, suitably from 1 to 200 atmospheres or higher, in order to facilitate the handling of ethylene. Much higher pressures, up to several thousand atmospheres, can be employed, but it is not desirable to do this in view of the extraordinary activity of the catalysts at lower pressures. Similarly, extremely low temperatures may be employed. The preferred temperatures are within the range of about 0–200° C.

The polymerization of ethylene, according to the process of this invention, takes place most satisfactorily when the polymerization mixture is substantially moisture-free and also free of other sources of hydroxyl groups. Carbon dioxide should also be substantially excluded. As in numerous other ethylene polymerization processes, the polymerization mixture in the process of this invention is preferably kept free of oxygen, since oxygen reacts with the catalyst. In practical operations the oxygen content should preferably be held below 20 parts per million.

The polymerization of ethylene is preferably carried out in the presence of an inert liquid reaction medium. Preferred reaction media are saturated and aromatic hydrocarbons such as cyclohexane, n-decane, benzene and toluene.

The novel catalysts described herein can be employed in a dissolved or finely dispersed form. It is in general preferred to admix the catalyst components in a dissolved state, i.e., dissolved in the reaction medium. The catalyst components react more rapidly with each other to form the active complex when in a dissolved state. The active chromium complex may be prepared in a separate and prior step. If it is desired to store the prepared complex, such should be done at around 0° C. and in the absence of water or oxygen, which decompose the complex.

The invention is further illustrated by the following examples:

*Example I*

Into a glass reaction vessel equipped with a reflux condenser, stirrer, inlet and outlet valves was charged under a blanket of nitrogen 500 ml. of cyclohexane, 0.002 mole of chromyl chloride, $CrO_2Cl_2$, and 0.002 mole of lithium aluminum tetraheptyl dissolved in 20 ml. of cyclohexane. The nitrogen was then replaced by ethylene at atmospheric pressure. The reaction mixture was agitated under atmospheric ethylene for a period of one hour and then poured into excess methanol. The resulting precipitated polymer was filtered, washed with acetone and dried at 70° C. in a vacuum oven. The weight of the solid, white polymer was 2.1 grams. The polymer was found to have a density of 0.96 and could be molded into tough films by pressing under 20,000 p.s.i. at 190° C. for a period of 2 minutes.

*Example II*

Into a stainless steel pressure vessel having an approximate capacity of 330 ml. was charged under a blanket of nitrogen 100 ml. of benzene, 0.005 mole of chromium acetyl acetonate and 0.01 mole of lithium aluminum tetracyclohexenylethyl. The reaction vessel was flushed with ethylene, heated to 100° C., pressured to 1000 p.s.i. with ethylene, and agitated for a period of 30 minutes. The pressure vessel was then cooled to room temperature, excess monomer was vented off, and the reaction mixture was filtered. The resulting polymer was washed and dried. The white polymer could be molded at 190° C. into tough films having a density of 0.97.

*Example III*

Into a stainless steel pressure vessel having an approximate capacity of 330 ml. was charged under a blanket of nitrogen 100 ml. of benzene, 0.005 mole of chromium trichloride, and 0.01 mole of lithium aluminum tetracyclohexenylethyl. The reaction vessel was flushed with ethylene, heated to 150° C., pressured to a 1000 p.s.i. with ethylene and agitated for a period of 30 minutes. After cooling to room temperature and venting off of excess monomer, the reaction mixture was filtered. The resulting polymer was washed and dried, yielding 1 gram of a white polymer solid. The polymer could be molded into tough films by pressing at 190° C. under a pressure of 20,000 p.s.i. for a period of 2 minutes.

It is to be observed that the foregoing examples are illustrative only and that numerous embodiments of the invention will occur to those who are skilled in the art.

The products obtained by polymerizing ethylene with catalysts hereinabove disclosed are solid polymers exclusively and are not contaminated with Friedel-Crafts type of oily polymers.

The quantity of catalyst can be varied over a rather wide range. It is desirable to employ a quantity of catalyst which is at least large enough to produce a reasonably rapid rate for a reasonably long period of time. Suitably, the preferred quantity is within the range of .001% to 10% based on the weight of chromium per unit weight monomer.

The molar ratio of the chromium compound to the alkali metal aluminum tetraalkyl can be varied over a wide range. Even the addition of minute quantities of one component to the other will lead to the formation of some of the reactive complex. However, to achieve the highest catalytic activity, it is preferred to employ a molar ratio of the chromium compound to the alkali metal aluminum tetraalkyl from 0.5 to 5.

The activity of the novel catalyst described hereinabove is of such a nature that the catalyst is well suited for polymerization of ethylenically-unsaturated compounds other than ethylene, suitable examples of other polymerizable olefinic compounds being propylene, butadiene, styrene, cycloalkenes, etc.

The structure of the polyethylene made in accordance with the process of this invention evidently is characterized by being a straight chain hydrocarbon with vinyl groups at one or both ends of at least some of the molecules. The infrared measurements indicate very little methyl substitution and a very small number of vinylidine groups, with little or no transunsaturation or carbonyl groups.

The ethylene polymers obtained in accordance with the process of this invention are highly valuable in numerous applications, especially in the form of films, molded articles, extruded insulation on wire, etc.

We claim:

The process of polymerizing ethylene comprising adding ethylene to a reaction mixture comprising the product formed by admixing a chromium salt, wherein the chromium is combined with radicals of the class consisting of alkoxy radicals and radicals which form acids when combined with hydrogen, with lithium aluminum tetracyclohexenylethyl in sufficient quantity to reduce the chromium in said chromium compound, and an inert organic solvent and thereafter removing a solid polymer of ethylene.

References Cited in the file of this patent

UNITED STATES PATENTS

| | | |
|---|---|---|
| 2,781,410 | Ziegler et al. | Feb. 12, 1957 |
| 2,822,357 | Brebner et al. | Feb. 4, 1958 |
| 2,839,518 | Brebner et al. | June 17, 1958 |

FOREIGN PATENTS

| | | |
|---|---|---|
| 534,792 | Belgium | May 2, 1955 |
| 533,362 | Belgium | May 16, 1955 |

OTHER REFERENCES

J. Organic Chemistry, vol. 10 of 1945 (pages 505–515).